United States Patent
Franklin

(10) Patent No.: US 12,314,822 B2
(45) Date of Patent: *May 27, 2025

(54) SYSTEMS AND METHODS OF WINDOWING TIME SERIES DATA FOR PATTERN DETECTION

(71) Applicant: NASDAQ, INC., New York, NY (US)

(72) Inventor: Andrew Franklin, New York, NY (US)

(73) Assignee: Nasdaq, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,109

(22) Filed: Jul. 13, 2023

(65) Prior Publication Data

US 2023/0359939 A1    Nov. 9, 2023

Related U.S. Application Data

(63) Continuation of application No. 16/451,607, filed on Jun. 25, 2019, now Pat. No. 11,748,654.

(60) Provisional application No. 62/689,545, filed on Jun. 25, 2018.

(51) Int. Cl.
   *G06N 20/00*          (2019.01)
   *G06F 18/20*           (2023.01)
   *G06F 18/214*         (2023.01)

(52) U.S. Cl.
   CPC ............ *G06N 20/00* (2019.01); *G06F 18/214* (2023.01); *G06F 18/285* (2023.01); *G06F 18/29* (2023.01)

(58) Field of Classification Search
None
See application file for complete search history.

(56) References Cited

U.S. PATENT DOCUMENTS

| | | | |
|---|---|---|---|
| 9,929,743 B1 | 3/2018 | Acuña-Rohter | |
| 11,282,139 B1 | 3/2022 | Winklevoss | |
| 2003/0018652 A1 | 1/2003 | Heckerman et al. | |
| 2004/0204975 A1 | 10/2004 | Witting | |
| 2007/0130171 A1 | 6/2007 | Hanckel et al. | |
| 2007/0244741 A1 | 10/2007 | Blume et al. | |
| 2011/0178847 A1 | 7/2011 | Rane et al. | |
| 2011/0231305 A1 | 9/2011 | Winters | |
| 2015/0019513 A1* | 1/2015 | Dey | G06F 16/1748 707/746 |

(Continued)

OTHER PUBLICATIONS

International Search Report and Written Opinion for International Application No. PCT/US2019/038916, 15 pages, mailed Sep. 13, 2019.

(Continued)

*Primary Examiner* — Randolph I Chu
(74) *Attorney, Agent, or Firm* — Nixon & Vanderhye P.C.

(57) ABSTRACT

A data analysis computer system is provided that receives a timeseries dataset and generates implied data from the dataset. The dataset is further vectorized to reduce the dimensionality of the data. Users provide input to identify windows of data that either positively or negatively correlate to instances of a given type of occurrence within the data. The user defined windows are converted to fixed sized windows and a machine learning algorithm constructs a model from the data. The model is used to predict instances of the given type of occurrence in newly received data. Validation of the predications may be performed.

20 Claims, 17 Drawing Sheets

(56) References Cited

U.S. PATENT DOCUMENTS

2018/0024901 A1* 1/2018 Tankersley ....... G06Q 10/06393
              707/694
2018/0246941 A1  8/2018 Salunke et al.
2019/0379589 A1* 12/2019 Ryan ..................... G06F 17/142
2019/0392255 A1 12/2019 Franklin

OTHER PUBLICATIONS

Written Opinion of the IPEA for International Application No. PCT/US2019/038916, seven pages, mailed Oct. 14, 2020.
International Preliminary Report on Patentability of the IPEA for International Application No. PCT/US2019/038916, eight pages, mailed Jan. 13, 2021.
Incrediblecharts, https://www.incrediblecharts.com/help/chart_intervals.php, archived on Jul. 1, 2017 (Year: 2017).

* cited by examiner

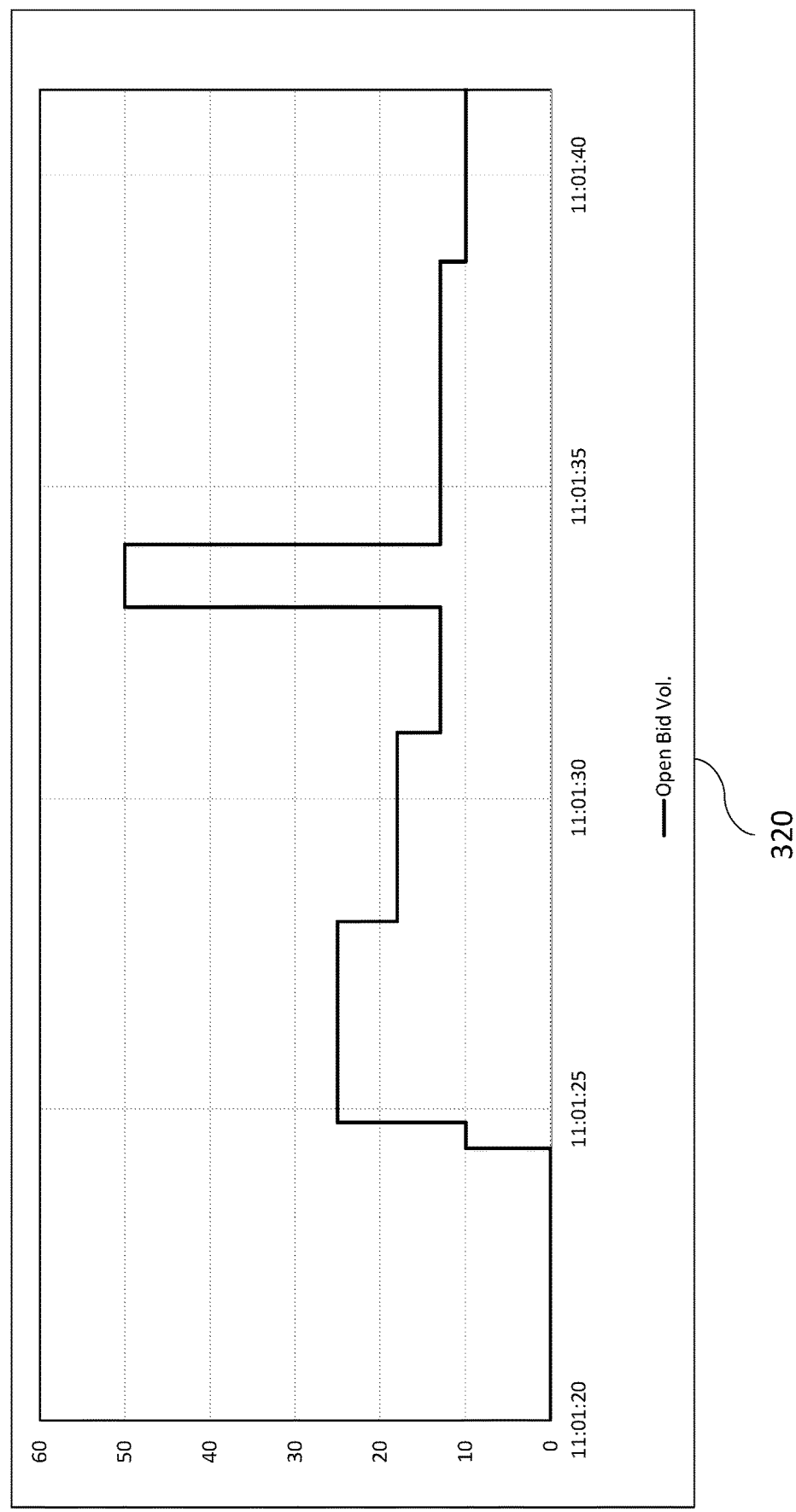

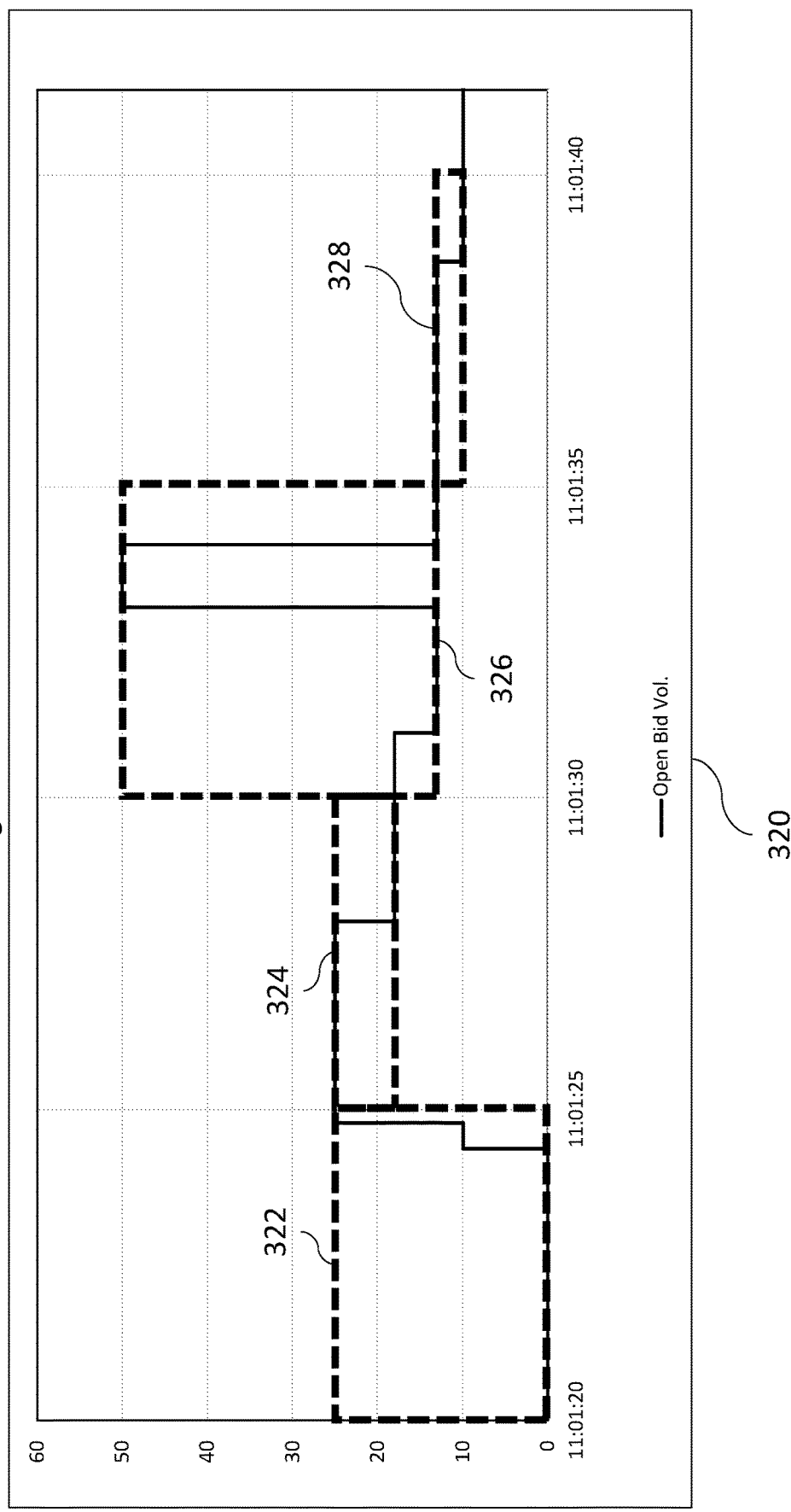

Fig. 3E

| Time | Open Bid Vol. | L1 Bid Vol. |
|---|---|---|
| 11:01:24.388 | 10 | 10 |
| 11:01:24.800 | 25 | 10 |
| 11:01:28.000 | 18 | 3 |
| 11:01:31.000 | 13 | 13 |
| 11:01:33.000 | 50 | 13 |
| 11:01:34.000 | 13 | 13 |
| 11:01:38.500 | 10 | 10 |

350

⇧

352

| Time | OBV_1st | OBV_Min | OBV_Max | OBV_Last |
|---|---|---|---|---|
| 11:01:20 | 0 | 10 | 25 | 25 |
| 11:01:25 | 25 | 18 | 18 | 18 |
| 11:01:30 | 18 | 13 | 50 | 13 |
| 11:01:35 | 13 | 10 | 13 | 10 |

322
324
326
328

SYSTEMS AND METHODS OF WINDOWING TIME SERIES DATA FOR PATTERN DETECTION

CROSS REFERENCE(S) TO RELATED APPLICATION(S)

This application is a continuation of U.S. patent application Ser. No. 16/451,607, filed Jun. 25, 2019, now allowed; which claims priority to U.S. Provisional Application No. 62/689,545, filed Jun. 25, 2018, the entire contents of which are hereby incorporated by reference.

TECHNICAL OVERVIEW

The technology described herein relates to processing and/or preparing datasets to be used for pattern detection. More particularly, the technology described herein relates to intervalizing time series data, annotating data, and windowing the data such that patterns within the dataset may be identified.

INTRODUCTION

Machine learning can give computers the ability "learn" a specific task without expressly programming the computer for that task. This may be accomplished by developing a model based on an initial data and then using that model to assess new data. One potential issue with this approach is that the initial data set (and the subsequent dataset) can be so large that it can be computationally expensive to develop a model from the initial data. Indeed, extremely large datasets can be difficult to parse in such a way as to provide meaningful input for a machine learning process and development of a model.

Accordingly, it will be appreciated that new and improved techniques, systems, and processes are continually sought after. Such techniques may include new and improved techniques in the area of preparing or otherwise organizing data that will be used as input for a pattern recognition or machine learning process and development of a model.

SUMMARY

A data analysis computer system is provided that receives a dataset and generates implied data from the dataset. The data within the dataset is temporal in nature an associated with a given participant or group of participants (e.g., an organization). The data is then intervalized to decrease or reduce the number of records that are being worked with. Users provide annotations to the data. The annotations may be provided in the form of windows over a time frame of the data and can be used to identify patterns within the dataset. The windows of data may positively or negatively correlate to identified instances of a given pattern within the data. The user defined windows are converted to fixed sized windows and a machine learning algorithm constructs a model from the data. The model is used to predict instances of the given type of occurrence in newly received data. Validation of the predications may be performed.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 3C is a graph of example data according to certain example embodiments;

FIG. 3D is a graph that illustrates bounding the data contained or represented by the graph in FIG. 3C according to certain example embodiments;

FIG. 3E shows a table of the data from the graph in FIG. 3C and a table that represents the bounding of the data shown in FIG. 3D according to certain example embodiments;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain examples, a data analysis system is provided that is configured to receive a dataset of time series data. The data analysis system may generate additional data (e.g., implied data) from the received data. The size of the dataset is then reduced by bounding the data along given or set time intervals. The intervalized dataset is then analyzed (e.g., by a user) to define windows over the dataset. The windows are used to identify portions of the dataset that match a given criteria or pattern. The windows may be of arbitrary size (e.g., in that the size is decided by the user). Once the user has defined the windows, then the data analysis system may convert (e.g., automatically and/or programmatically) those user-specified windows into one or more fixed sized windows. The data and corresponding fixed-sized windows are then processed through a machine learning process to produce a model. The model is stored for later use. The model may be used to automatically identify windows over new or other data that is received. The automatically identified windows may then be verified (e.g., by a user) to reinforce or otherwise adjust the underlying model.

Figure 1:
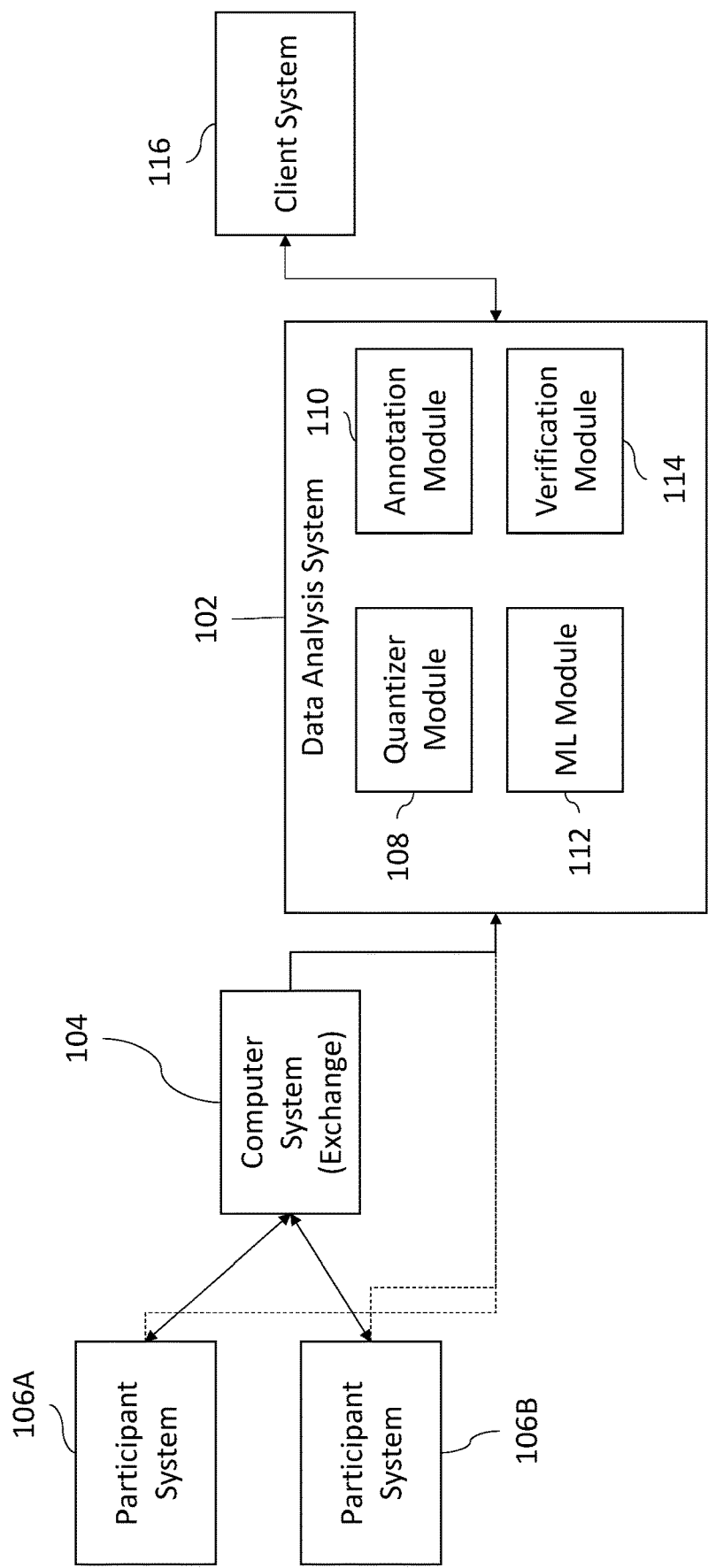
FIG. 1 is a diagram that shows multiple computer systems, including a data analysis system, according to certain example embodiments.
Figure 2A:
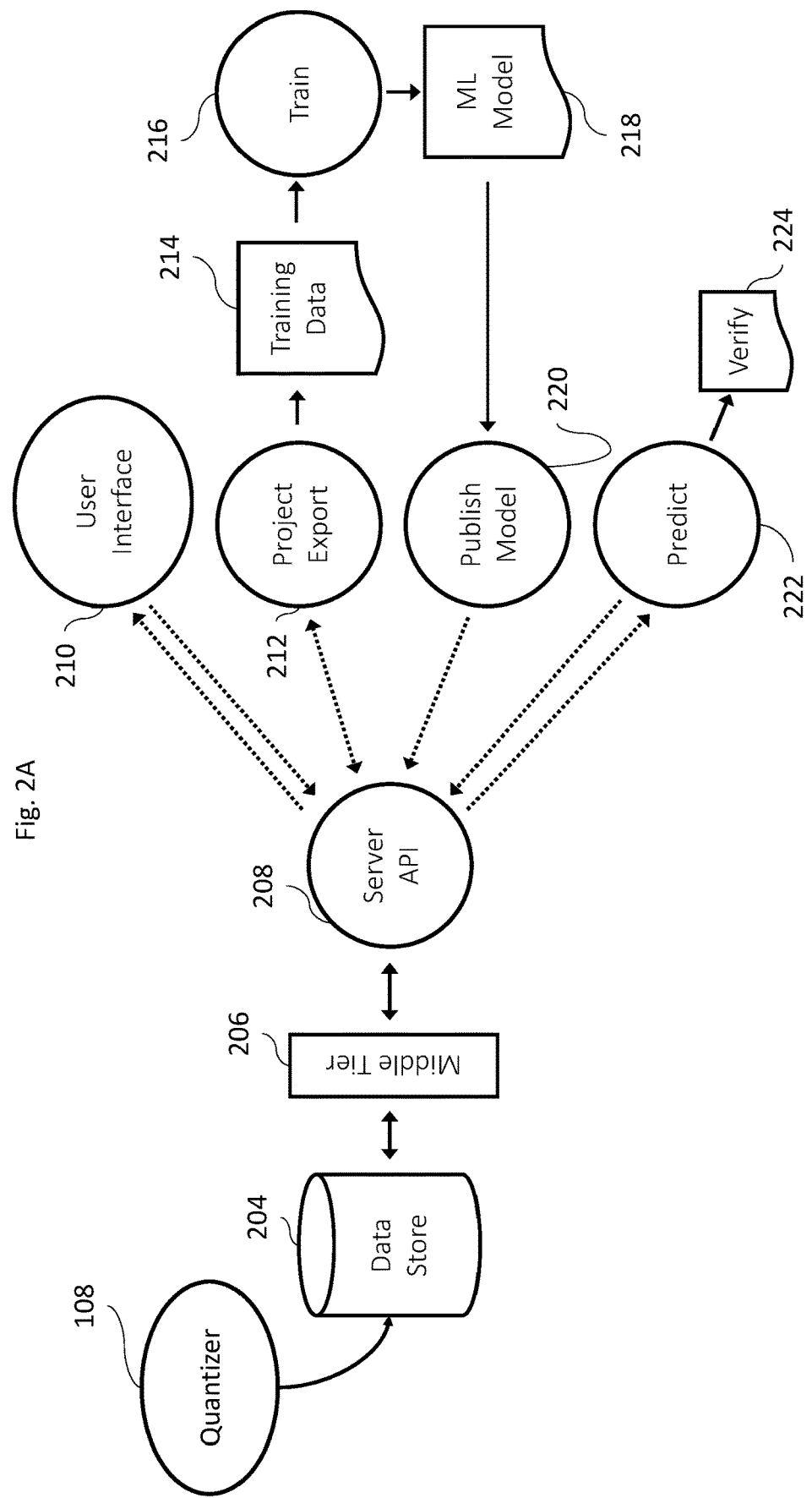
FIG. 2A shows different modules or components that are used to provide data analysis according to certain example embodiments.
Figure 2B:
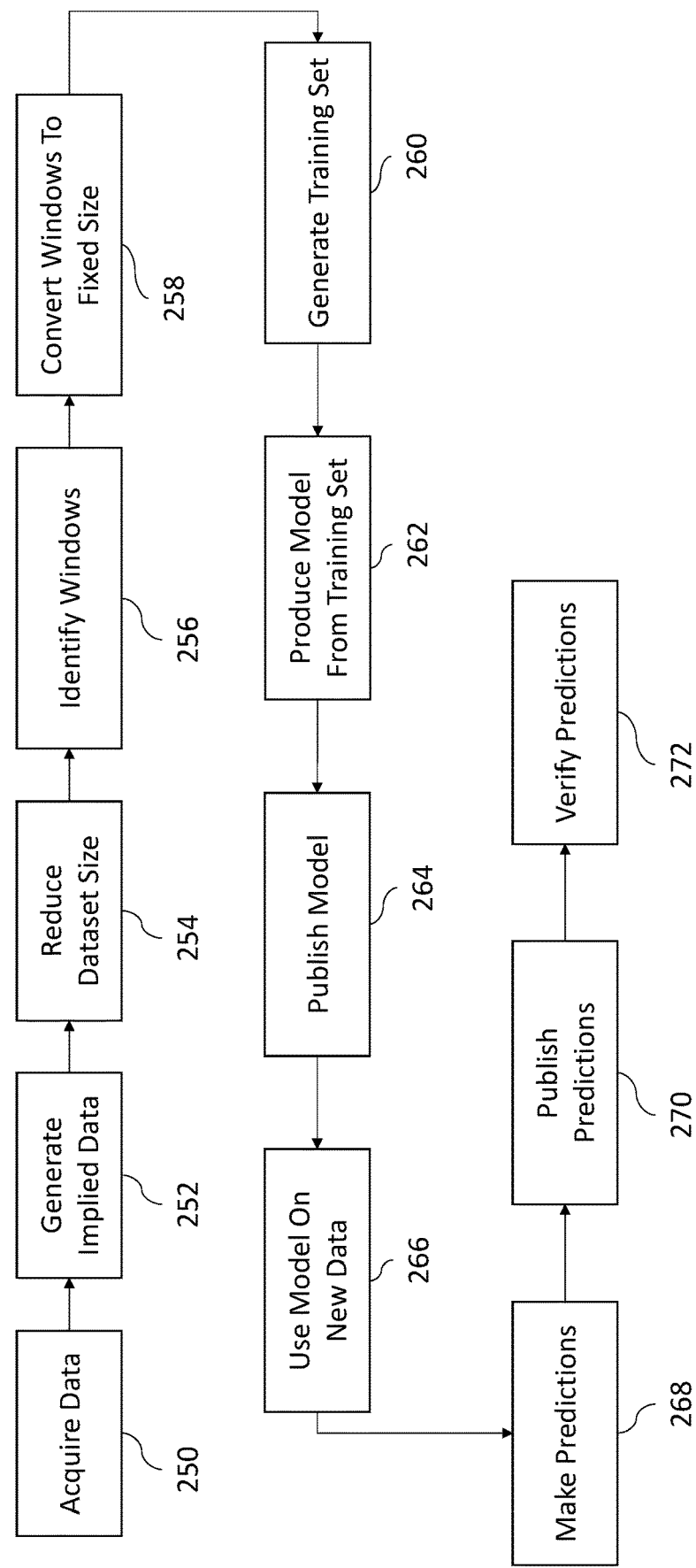
FIG. 2B is an example flow chart according to certain example embodiments.

FIG. 1 is a diagram that shows the multiple computer systems that interact with a data analysis system. FIG. 2A illustrates the different modules that may be implemented on the data analysis system (or other systems) shown in FIG. 1. FIG. 2B is a flow chart of a process that may be implemented using the components and systems shown in FIGS. 1 and 2A. FIGS. 3A-3E are example data sets that are processed by the systems in FIG. 1 and graphs of those datasets that may be shown to a user using a computing device of FIG. 10.

Figure 3A:
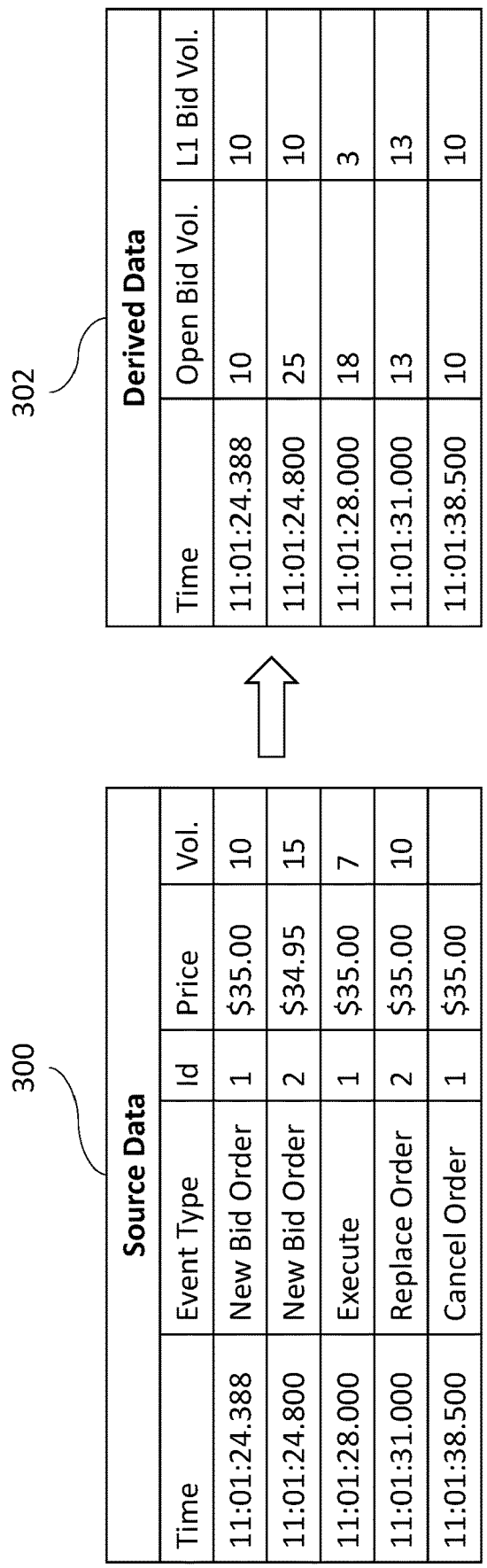
FIG. 3A shows a table of source data and a table of data that is derived from the source data according to certain example embodiments.
Figure 3B:
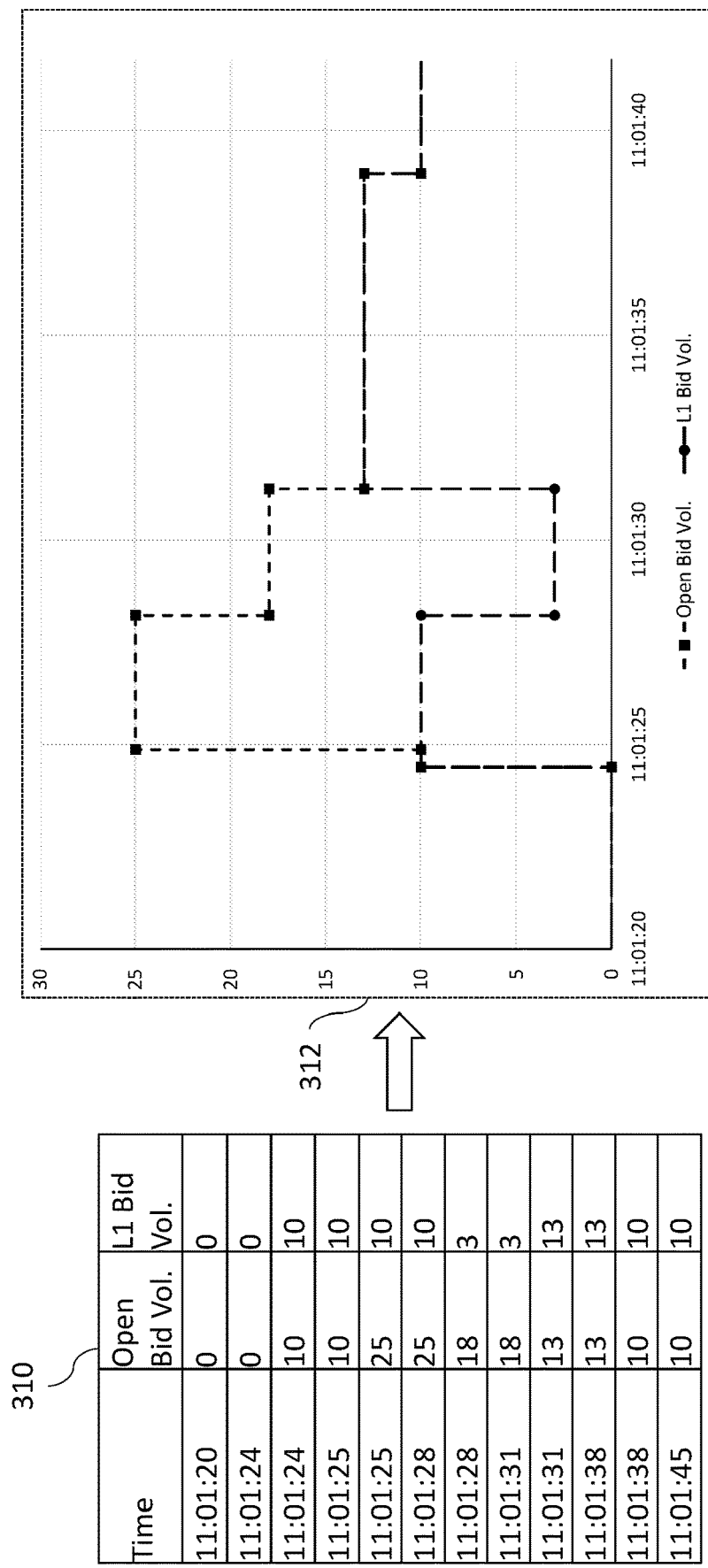
FIG. 3B shows a table of data and corresponding graph of the data in the table according to certain example embodiments.
Figure 4:
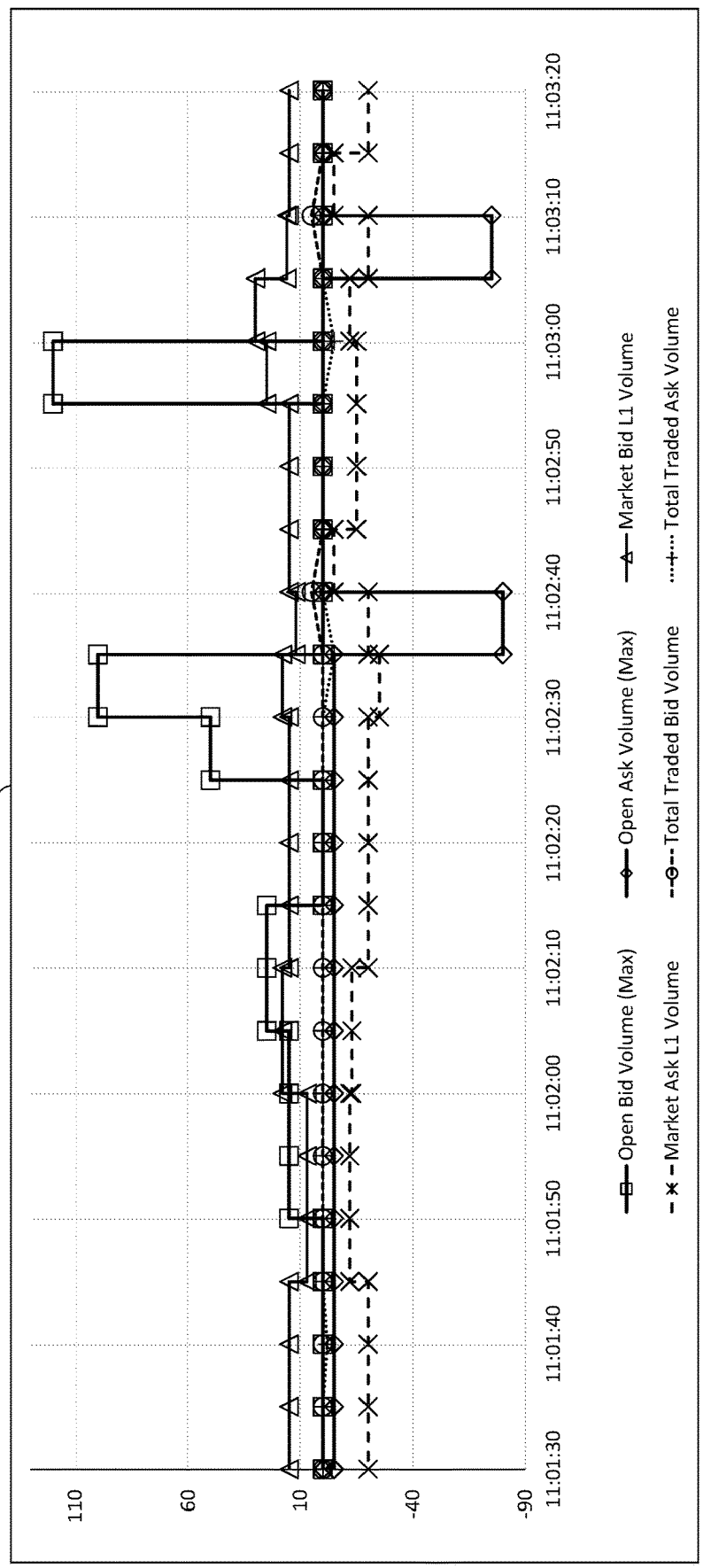
FIG. 4 is an illustrative graph with different types of data plotted thereon according to certain example embodiments.
Figure 5:
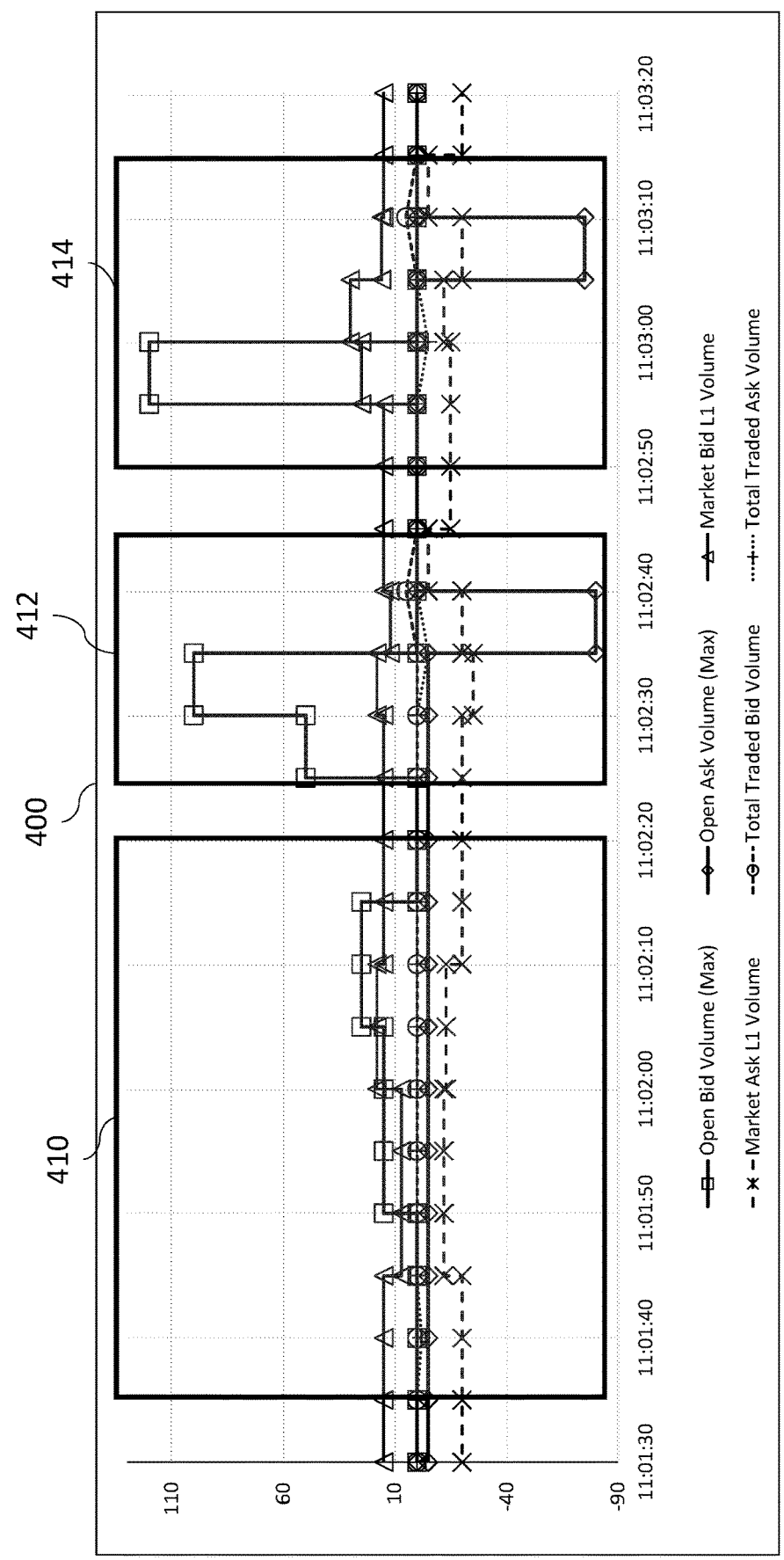
FIG. 5 illustrates example windows that may be defined over the graph in FIG. 4 according to certain example embodiments.
Figure 6A:
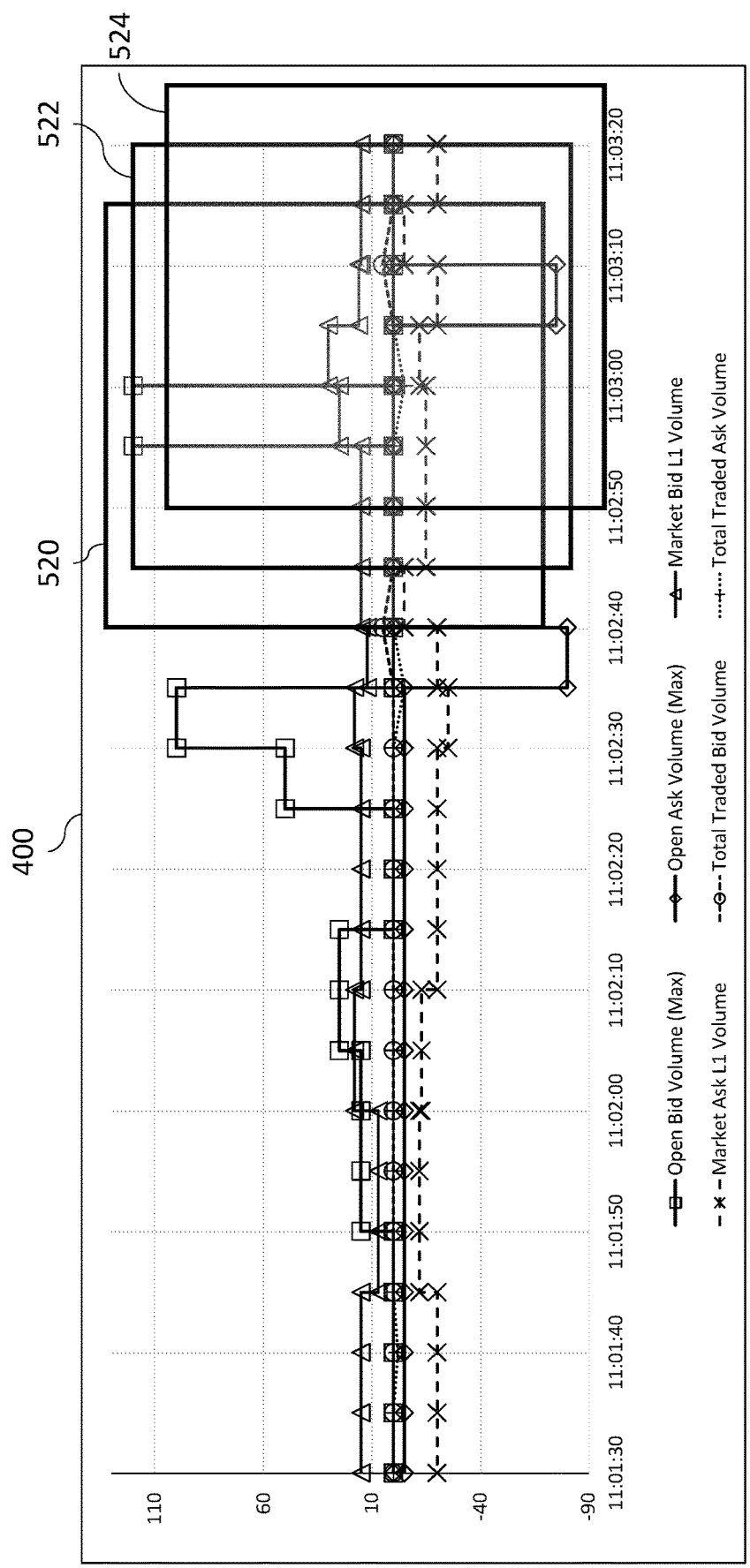
FIGS. 6A-6C show how the example windows may be converted into fixed length windows according to certain example embodiments.
Figure 6B:
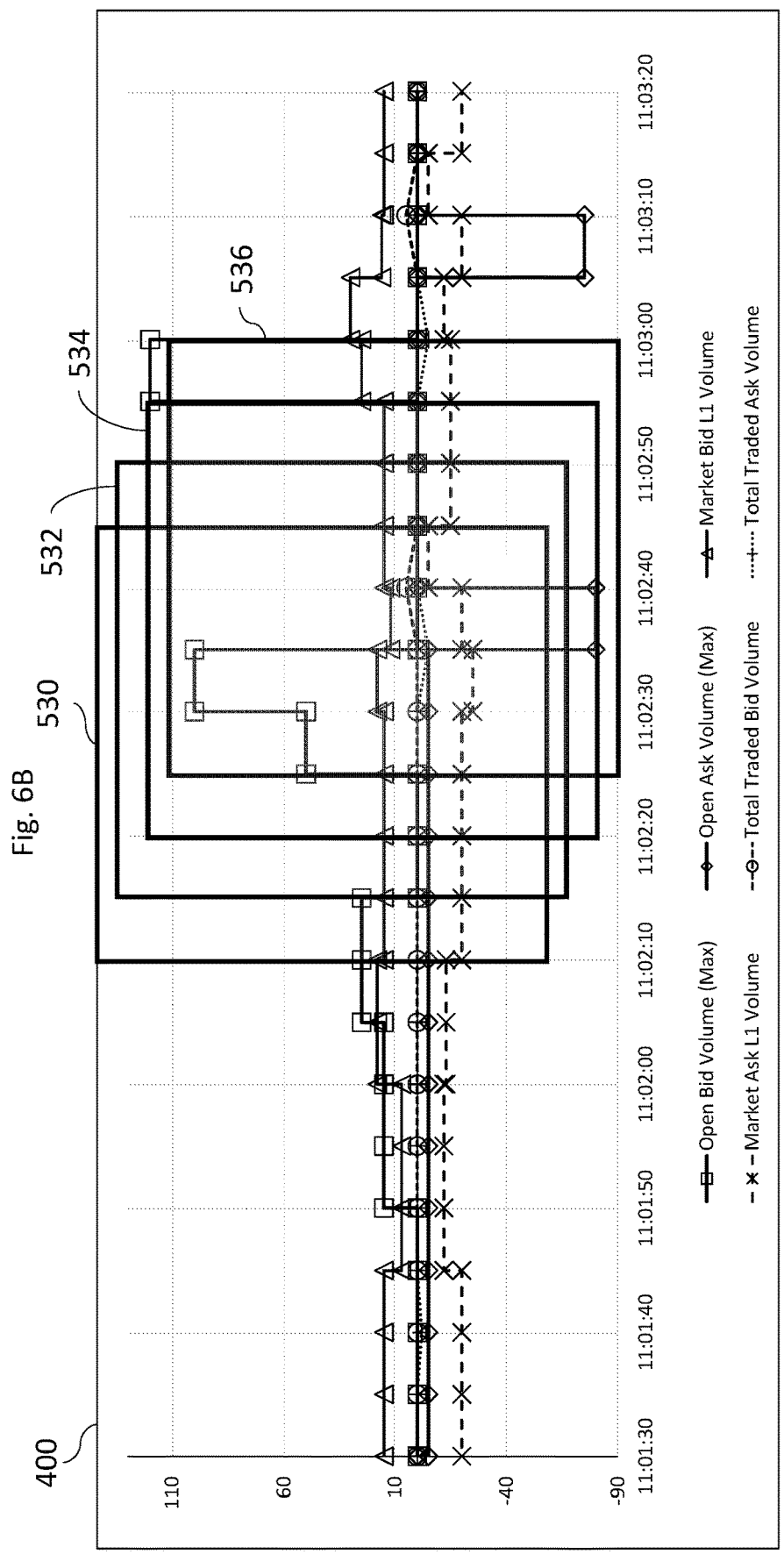
Figure 6C:
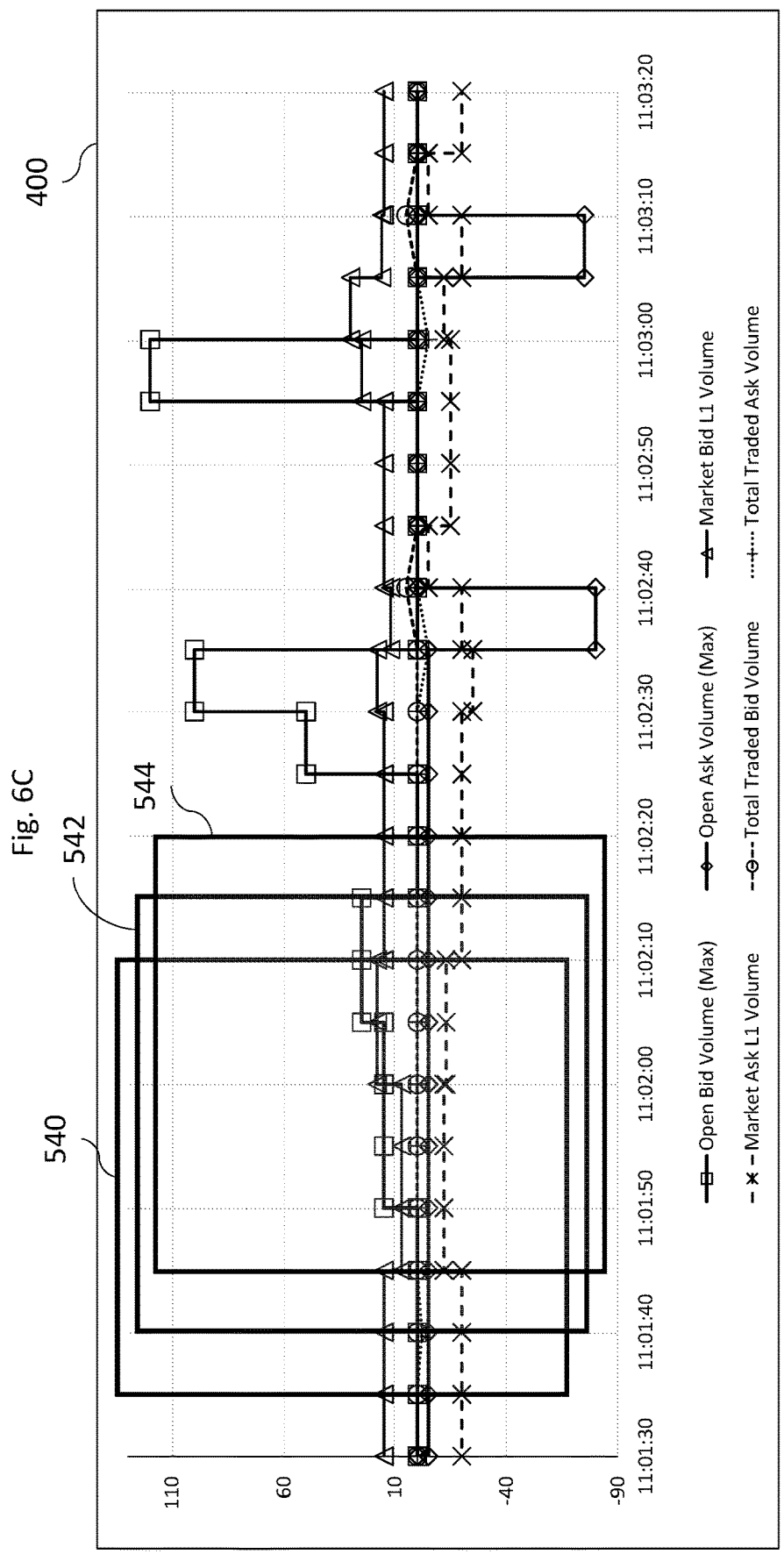
Figure 7:
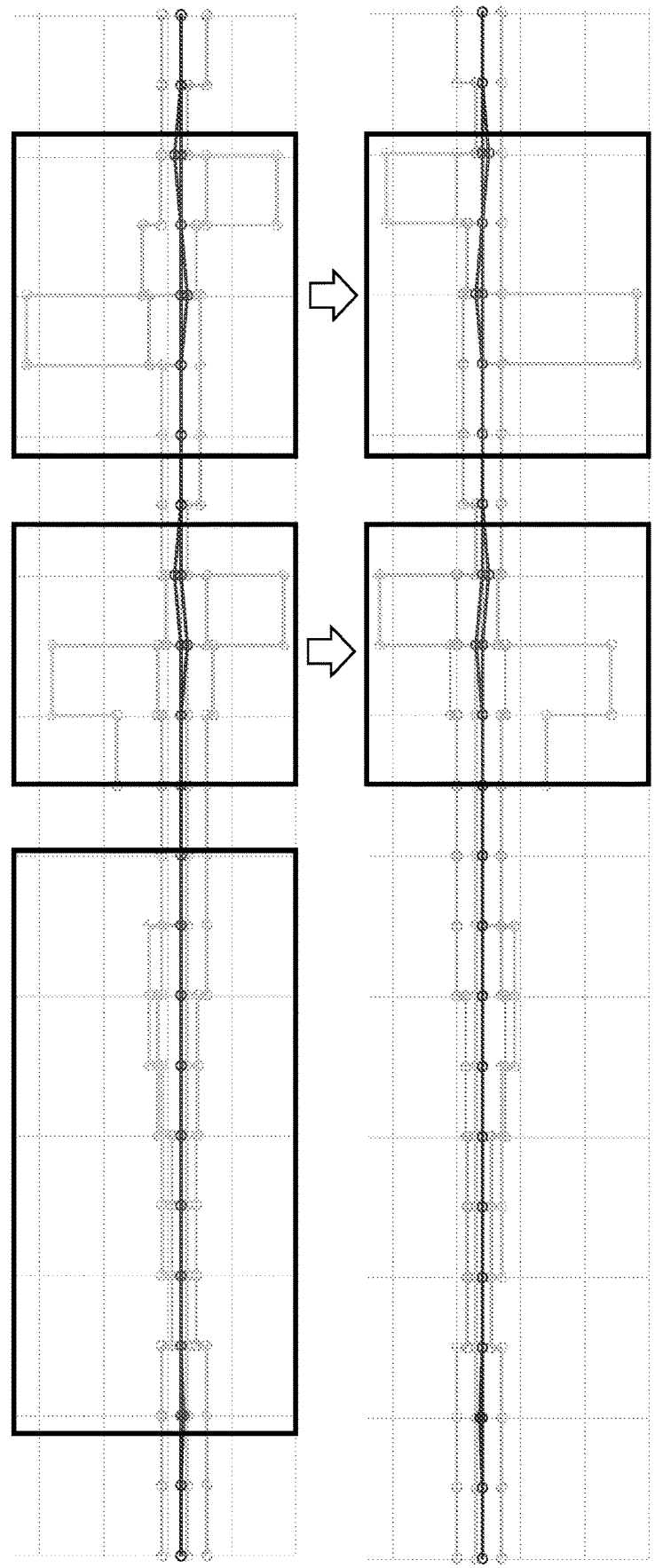
FIG. 7 shows two graphs that illustrate how data may be mirrored according to certain example embodiments.
Figure 8:
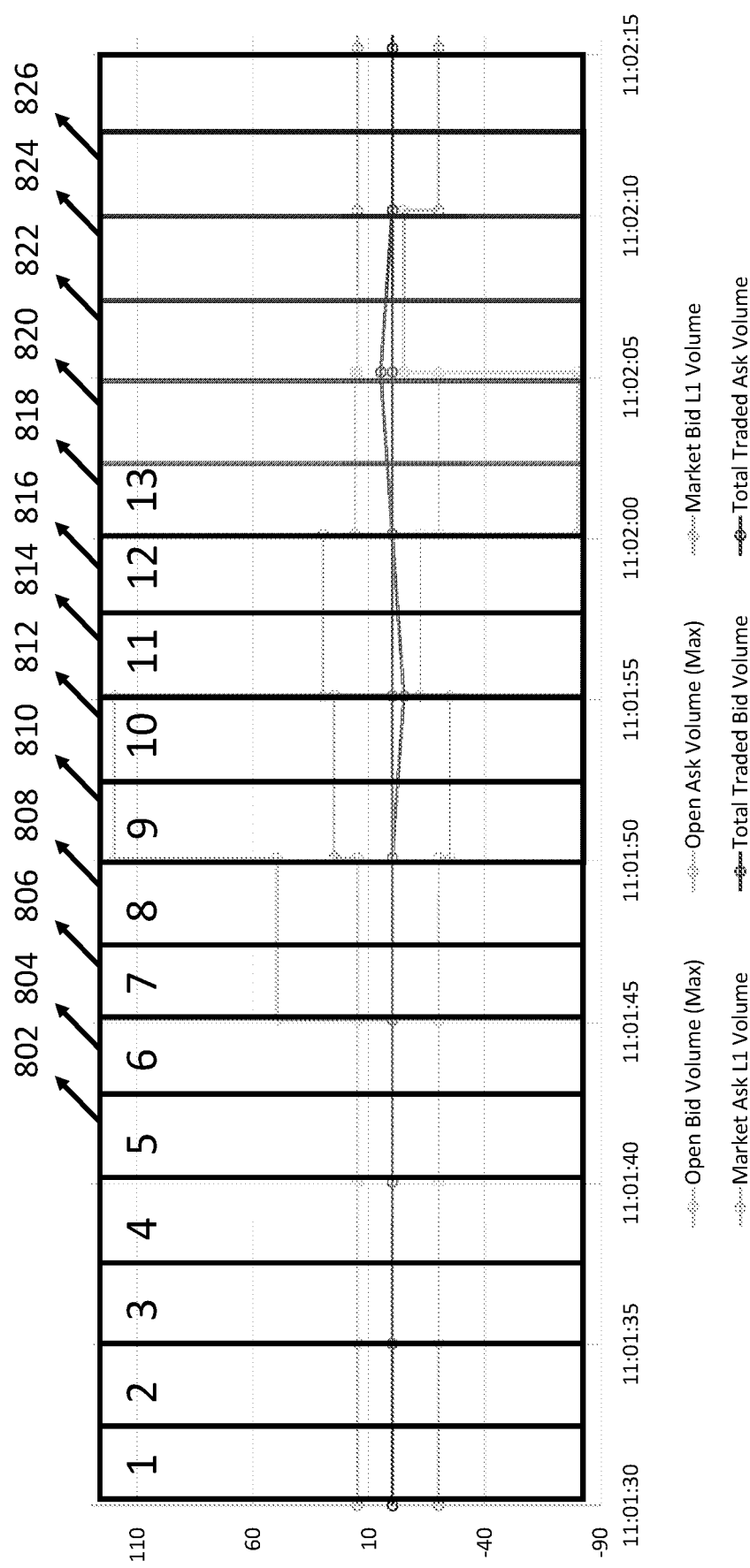
FIG. 8 illustrates predictive windows that have been identified by a machine learned model according to certain example embodiments.
Figure 9:
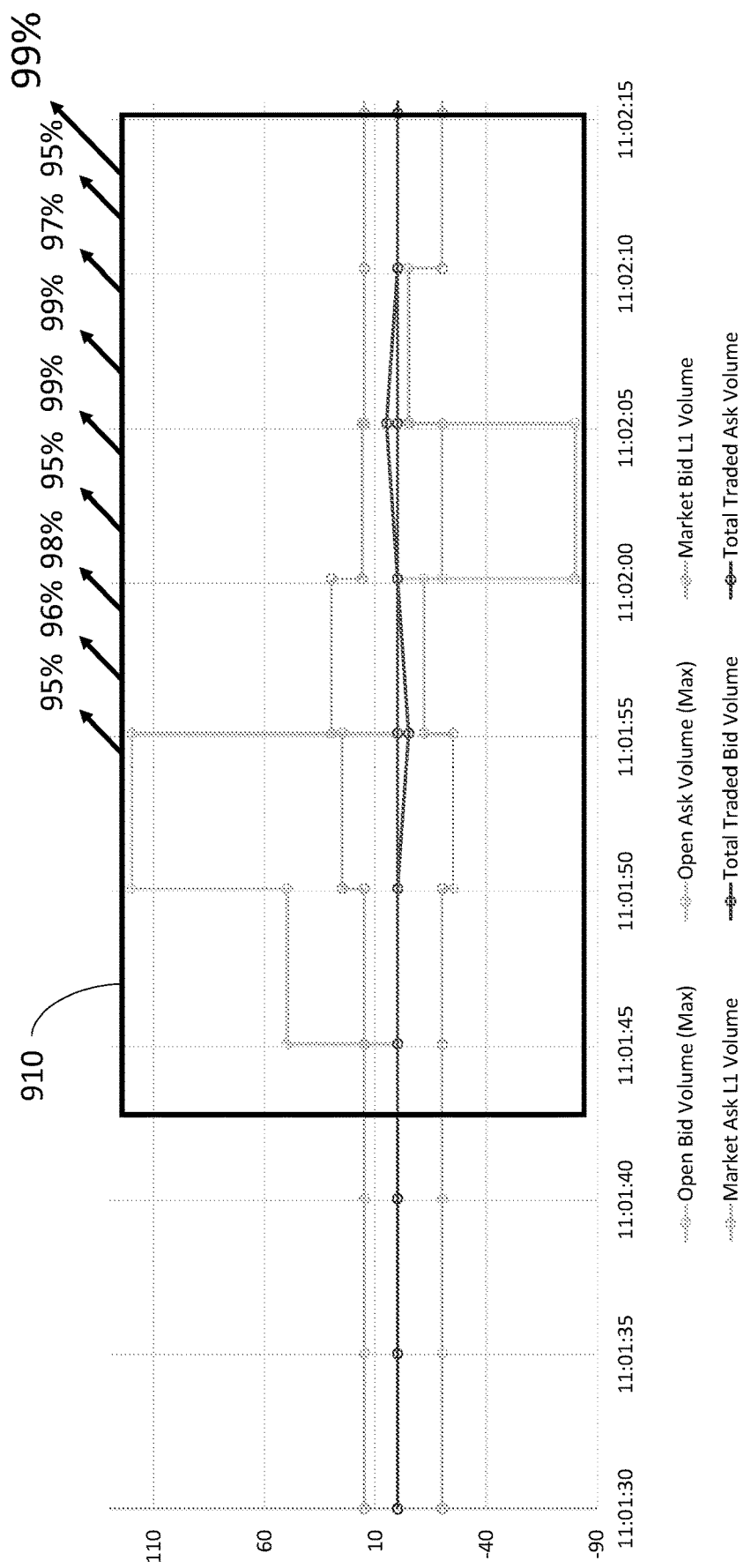
FIG. 9 illustrates how the predictive windows shown in FIG. 8 may be combined to form a window that is to be attached to a task according to certain example embodiments.
Figure 10:
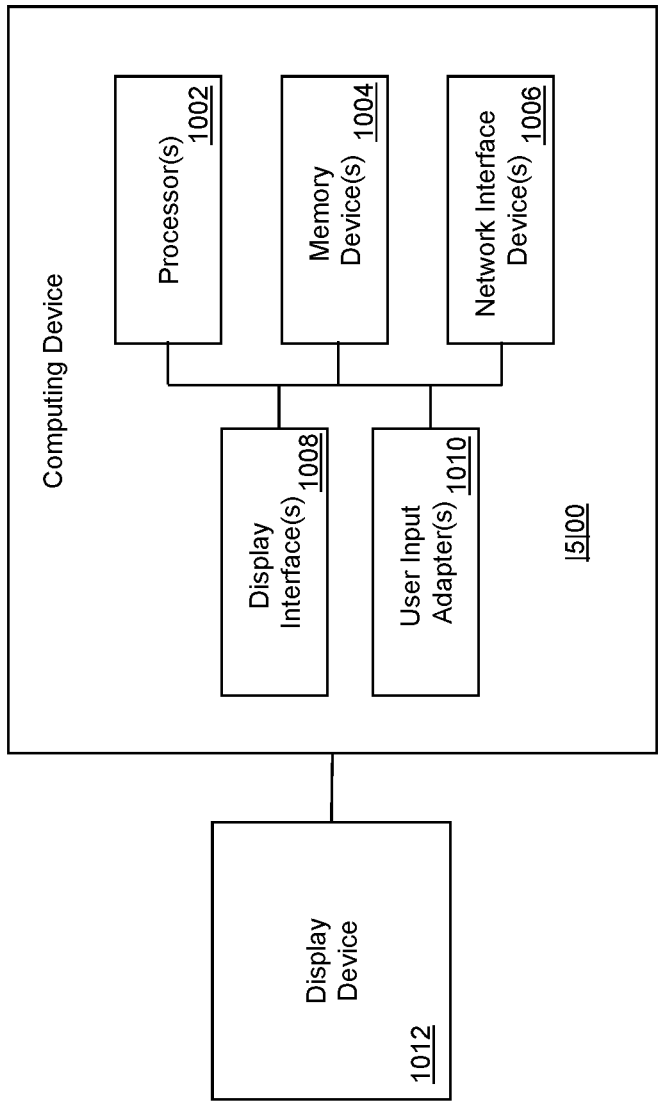
FIG. 10 shows an example computing device that may be used in some embodiments to implement features described herein.

FIG. 4 is an illustrative graph and FIG. 5 shows how windows may be defined over portions of the graph shown in FIG. 4. FIGS. 6A-6C graphically illustrate how example windows may be converted into fixed length windows. FIG. 7 illustrates how data may be mirrored. FIG. 8 graphically shows how a model may be used to automatically identify and rank windows. FIG. 9 shows how the automatically generated windows in FIG. 8 may be combined to form a window that is to be attached to a task. FIG. 10 shows an example computing device that may be used by the systems shown in FIG. 1, or may be configured to execute steps in the process shown in FIG. 2B, or configured to provide a display to any of the graphs or data tables shown in FIGS. 3B—FIG. 9.

In many places in this document, including but not limited to the description of FIGS. 1 and 2A, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 10.

Description of FIGS. 1-2A

FIG. 1 is a diagram that shows multiple computer systems, including a data analysis system, according to certain example embodiments. FIG. 2A shows different modules, components, and functionality that may be included in the data analysis system shown in FIG. 1.

Computer system 104 (also sometimes referred to as an exchange computer system or simply an exchange) can include a matching engine (not shown), order book (not shown), and network interfaces (not shown) for electronically communicating with participant computer systems 106A and 106B. Computer system 104 may be comprised of one or more of the computing devices shown in FIG. 10.

In general, participant computer systems 106A and 106B can include personal computers, mobile devices, automated computer systems, and the like. For example, each participant computer system may be a computing device as shown in FIG. 10.

Participant computer systems 106A and 106B submit electronic data messages that include data transaction requests (e.g., orders) that are subsequently processed by the matching engine of the computer system 104 and/or stored into the order book of the computer system 104. Orders are requests for a computer system (e.g., one or more automated exchange platforms) to take a given action (e.g., buy/sell) with respect to an identified resource (e.g., a ticker symbol). For ease of description, "orders" (or electronic orders) are used herein to also refer "data transaction requests" that are received and processed by computer system 104.

Once an order is received by computer system 104, a transactional record of how that order has been processed may be created. The transactional record may, for example, store data that indicates how the order book has been changed based on processing of the order (e.g., by either matching against another order that was already pending in the order book, being added to the order book, modifying or canceling an existing order, or other processing that is performed based on the order). Each of these records may be included into a dataset that is transmitted to the data analysis system 102. Computer system 104 may also transmit transaction receipts or other data to back to participant computer systems 106A/106B that provide a record of how the transaction was processed. In certain examples, participant computer systems 106A/106B may be programmed to generate their own transaction data (e.g., based on when an order is initially submitted or type of data transaction request is transmitted to computer system 102). Such transaction data may be directly (e.g., bypassing computer system 104) or indirectly communicated to data analysis system 102.

Data analysis system 102 receives datasets, which include a plurality of records, from computer system 104, participant computer systems 106A/106B, or both computer system 104 and one or more of the participant computer systems 106A/106B. In certain examples, each record within a dataset of records may include a timestamp, a participant, and a data payload that includes transaction data. The data payload may include, for example, ticker symbol information, price, quantity, or other data values that are used or processed by computer system 104 and/or participant systems 106A and/or 106B. Datasets may be transmitted in real-time (e.g., or substantially so, such as every second or every minute) or may be transmitted at the end of a trading day or trading week. In certain examples, the datasets received from the computer system 104 include core data processed by an exchange platform or matching engine of computer system 104. For example, the data may include core INET data when data is transmitted from a NASDAQ stock exchange computer system (e.g., an example of the computer system 104). In certain examples, data sets received from participant computer systems may include participant specific data that has been added to data (e.g., a transaction receipt) received from one or more computer systems that provide exchange or matching functionality. In certain examples, the data sets received by data analysis system 102 may be sent from computer systems other than computer system 104 or participant systems 106. For example, dataset may be transmitted from a data broker or other computer system that is operated by a third party (e.g., separately from computer system 104 and/or participant systems 106A/106B).

Data analysis system 102 is a computer system that includes a quantizer module 108, an annotation module 110, a machine learning module 112, and a verification and prediction module 114. Communication between the data analysis system 102 and computer system 104 may occur using an electronic data communications network, such as the Internet, or a private internal network (e.g., where data analysis system 102 and computer system 104 are controlled by the same organization).

Quantizer module 108 includes programmed functionality for receiving, validating, formatting, converting, or otherwise performing data vectorization on the dataset(s) received from computer system 104. Quantizer module 108 may also interface with a data store 204 for storing the received datasets (also referred to as transactional dataset(s)) and data generated from those datasets). In certain example embodiments, the data store 204 is a columnar oriented storage format. In certain examples, the quantizer module 108 may generate additional data (e.g., implied data) based on the data contained in the transactional datasets. In certain examples, the generation of implied data may generate more relevant features for performing pattern identification over a given dataset. Thus, for example, if the payload of records within a dataset includes over 100 (or even 1000) different features or parameters, a more limited number of features may be derived from that data and used to construct the dataset that is subsequently analyzed by data analysis system 102.

Quantizer module 108 may also be configured to generate data over timed intervals (e.g., the intervals may be dynamic, fixed, or otherwise determined). For example, quantizer module 108 may determine or calculate the first, last, high, and low values over every 5 ms time period of the transactional data (or other time period). This intervalized data may allow for the system to capture a higher level approximation of the transactional data. This functionality is described in greater detail in FIG. 3D. The timed interval values and/or the additionally generated data values may be stored to data store 204 (e.g., along with the transactional datasets). In certain examples, there may be tens, hundreds, or thousands of transactional records that may be encompassed within one intervalized data record (e.g., that defines a bound box for the given time period of, for example 1 ms or 5 ms). It will be appreciated that this type of approach may increase the efficiency at which the data analysis system 102 may process the information represented by the transactional data.

Annotation module 110 includes programmed functionality for displaying graphs of the intervalized data along with handling and processing annotations of the intervalized data. In particular, the annotation module may include a front end web application (user interface 210) that allows a user to specify or otherwise define a window over a certain area of a displayed graph. The defined windows may be stored for later processing. The annotation module 110 may also include graphing functionality for creating graphs that are displayed to a user. In certain examples, this is implemented as a web application (e.g., which may be developed using a user interface library). The data that is supplied to the web application, and then displayed to the user via the user interface, may be sourced via server API 208. The server API may access the data in the data store 204 via middle tier 206.

Machine learning (ML) module 112 includes programmed functionality for converting the user defined windows into fixed length windows. The data may be split into data for training and data for testing. In certain examples, the machine learning module 112 may handle data preparation. Part of the functionality of the machine learning module 112 includes retrieving the data in the data store 204 and converting it or organizing it into training data 214. The training data may be stored in a format more usable for machine learning. In certain examples, the format may be an H5 format (an open standard which is language agnostic).

The machine learning module 112 may include functionality that takes the training data 214 as input and trains a model at 216 to produce a machine learned model 218. Other types of machine learning implementations may also be implemented to train a model using the prepared data. The model may be published back to the data store 204 at 220.

In certain example embodiments, the training process for the model may be performed in an offline environment (e.g., by using graphical processing units, GPUs, that may be designed for machine learning). In certain examples, the training process may be parallelized across multiple different computing nodes. The distributed and parallelized machine learning process may increase the speed at which a model is developed.

A Prediction module 222 includes programmed functionality to use a generated model to make predictions with newly received data (e.g., from exchange 104). Predictions can then be published as tasks for review by a user and/or alerts to a surveillance system. The tasks (and predictions) may be made available to users via a client side client (e.g., a user interface) that allows a user to see the predictions on a displayed graph where the predictions can be verified 224 by a user on the client system 116, and added to the corpus of labelled examples. In certain examples, the verification at 224 can be used to assess whether the model 218 is sufficient for further use to, for example, automatically identify patterns in new datasets.

Description of FIG. 2B

FIG. 2B is an example flow chart showing a process that may be implemented using the system(s) shown in FIG. 1.

At 250, raw source data (e.g., time series data) is acquired from an external system, such as computer system 104. An example of such data is 300 in FIG. 3A. The data may be for or over a given time period (e.g., a day, a week, a minute, etc.). In examples where the data is from an exchange computing system and/or a matching engine, the data may be specific to a certain ticker symbol (or group of symbols) or across an entire market (e.g., for all ticker symbols). The data may be for those data transaction requests submitted by a specific userID, an organization, a group of users, or every data transaction request without regard to who submitted the request. In certain examples, the raw source data may represent every transaction or action that is performed against an order book.

At 252, the data analysis system 102 may calculate or otherwise generate implied data from the source data. An example of implied data is shown as 302 in FIG. 3A. This data may be stored along with the raw source data in a data store that is accessible by data analysis system 102.

At 254, the implied data and the raw data may be reduced in size to generate a reduced dataset size. Different techniques for reducing the data set size may be used. In general, data for each interval (e.g., from 11:01:20 to 11:01:25 in FIG. 3D) will be calculated and used to summarize the state of the data structure (e.g. order book) for a corresponding interval of time. In certain examples, at least two values will be calculated for each interval an may include, for example, the first, last, high, and/or low values of the data that is encompassed by a given interval.

In certain examples, a first process of reducing the dataset size may include taking the first, last, high, and low values for every time interval (e.g., every 1 ms, 5 ms, 10 ms, or any other time interval). Doing this will effectively create a "bounding box" around the relevant area of the data—as shown in the example graphs herein (e.g., defining the high and low values over the time period). An example is shown in FIGS. 3D and 3E.

Another process for reducing the dataset may be to take a weighted average, the first value, or the last value. In certain examples, a process may determine the volume weighted average price (VWAP) over the time sliced intervals. The numerator and denominator of the VWAP may be stored separately for each interval (e.g., volume*price and volume). It will be appreciated that storing the numerator and denominator separately may allow for multiple intervals to be combined (e.g., six 5-second intervals may be combined into a 30-second interval). The reduced dataset may be stored to a data store for further use.

At 256, the data analysis system 102 is configured to generate one or more graphs (e.g., as shown in FIG. 4) from the reduced dataset and present those graphs in a user interface to a user (e.g., via 210). One or more users may then define windows over portions of the displayed graphs (e.g., as shown in FIG. 5).

In certain examples, step 256 may be an automatic process that automatically defines windows with respect to the reduced dataset. For example, the predictions that are made in step 268 may be used to form windows that are automatically generated and used as the windows discussed in connection with step 256. In certain examples, the windows generated in step 256 may the result of step 272 after a user (or other process) has verified the predicted windows 268.

In certain examples, a seed example for what pattern the user is to identify within the dataset may be provided to the user. Such seeds may be drawn from: 1) prior court judgments or tips (for example, a prior court defined a specific instance as spoofing), 2) from other computer systems that may implement strictly defined rules for identification of patterns, 3) predictions from the model (described below) that may need additional refining, and/or 4) other models of anomaly analysis. In the case of seeds being drawn from prior predictions, this approach may thus form a loop between annotating/windowing the data and the model development and application of the model to generate predictions. Thus, for example, the very first instance in which a model is developed may be seeded from, for example, a prior court decision that helps a user to identify a particular pattern. Subsequent iterations of the loop may take into account predictions generated from a developed model. In certain instances, annotations/windows may be thus be suggested from these predictions.

In any event, the windows defined (or refined) by users may identify areas of interest or patterns in the data. These windows will be used to give the machine learning aspect of the data analysis system 102 examples of what to look for during the training process. In certain examples, the identified instances within the data may be patterns that correspond to bad trading behavior such as, for example, "spoofing." Other types of abusive or bad trading behavior may also be identified such as ramping (e.g., progressively pushing up the price of a security), dominating the market (e.g., at open or close to move the price in one direction or another), wash sale activity, etc. Users may identify those time periods with the pattern that is being searched for (e.g., suspected spoofing) as a positive example and those time periods that do not represent the pattern (e.g., no spoofing) as a negative example. In certain examples, both positive and negative examples are used by the machine learning module to develop a model. In certain examples, the patterns that are identified can be unknown patterns as well (e.g., not classified or labeled).

At 258, the data analysis system 102 converts the user defined windows into fixed sized windows. An example of this is illustrated in FIGS. 6A-6C. As explained in greater detail below, different methodologies may be employed for determining how to generate the fixed sized windows from the user-defined windows.

At 260, the training set is compiled from the generated fixed sized windows and the underlying data.

At 262, a machine learning algorithm is used to produce a model from the training set.

At 264, the model is published back to a data store where it is made available for use on other data. It will be appreciated that different data than the data used to generate the model may be used to further validate or test the model. For example, the model may be trained on data from June 2018, and then data from July 2019 may be used to validate the model.

At 266, the model may be applied to newly received data (e.g., data received from computing system 104). In certain example embodiments, the newly received data may be, for example, data from an ITCH data feed with each event message of the ITCH data feed being an entry of the newly received data.

At 268, the model may be used to automatically make predictions from the newly received data. An example of such predictions is illustratively shown in FIGS. 8 and 9. For example, the model may be used to predict situations in the newly received data that may represent spoofing.

At 270, the predictions may be published to a user interface such that user can verify or mark the predictions as being correct or incorrect at 272. The verifications and/or corrections may be used to further adjust the model (e.g., further train the model).

Description of FIGS. 3A-3E

FIGS. 3A-3E show a series of tables and graphs that may be processed, stored, and/or displayed by a computer system (e.g., data analysis computer system 102).

FIG. 3A shows a table of source data 300 that is received from computer system 104 and a table of derived data 302 that is derived from the source data. The source data 300 is an example of a time series dataset that includes multiple stateful time series transaction data records (e.g., each row in dataset 300). Each row includes transaction information that may be used to reconstruct the state of a data structure at a given point in time (e.g., when processed with prior records within dataset 300). The transactional information may include data that represents each action or transaction that has been performed against one or more data structures (e.g., order books).

This reconstruction of a data structure may then be used to form the data in the rows included in derived data 302.

Accordingly, source data 300 may be used to generate derived data 302 by applying source data 300 to a model or state machine that is used to represent the state of the data structure at a particular point in time.

As an example, the source data 300 may be used to reconstruct an order book (e.g. a data structure) for a particular instrument or security. The reconstruction of the order book may thus turn the stateful (e.g., such that the state of the order book at a point in time that corresponds to each record is dependent on the prior records within the dataset) time series data of source data 300 into the stateless (e.g., where the state of the order book in connection with a given record is reflected in the given record and not dependent on other records within a dataset) data for derived data 302 (e.g., where each record represents the state of an order book at a particular point in time). More specifically, each record in a source data 300 may be applied, in order, to a state machine that is used to keep track of and model how an order book operates based on, for example, the event type that is included within each record of the source data 300 (e.g., "New Bid Order", "Execute", "Replace Order," "Cancel Order," etc.). Each state (e.g., the open bid volume and/or the L1 bid volume) of the order book (or other data structure) may then be stored as a record in the derived dataset 302.

In certain examples, the number of rows (e.g., records) a data set of source and/or derived data may number in the thousands, millions, or perhaps billions or more. Each row or record may correspond to, for example, an event message that is transmitted as part of an electronic data feed. An example of an electronic data feed may be the ITCH protocol. Other data protocols may be used. For example, an internal data feed from a matching engine of an automated electronic exchange may be used.

In certain examples, generating the stateless dataset (derived dataset 302) may allow for parallelization of the various records within the dataset because the respective records do not need to be processed in any particular order (e.g., they are stateless with respect to time).

FIG. 3B shows a table of data 310 that has been derived and corresponding graph 312 of the data in table 310. In certain examples, the graph 312 may be displayed to a user in a user interface according to certain example embodiments.

FIG. 3C is a graph 320 of example data according to certain example embodiments. FIG. 3D shows the graph 320 from FIG. 3C that illustrates how the data represented in the graph may be bounded or contained. In particular, the data is sliced in 5 second increments and bounded by boxes 322, 324, 326, and 328. FIG. 3E shows a table 350 of the data from the graph in FIG. 3C and a table 352 that represents the bounding of the data shown in FIG. 3D. The dataset shown in table 352 may be an example of an intervalized dataset. As shown in table 352, 4 different values, as discussed herein, are calculated per record of the dataset. In certain examples, at least 2 values may be calculated (e.g., if the components of VWAP are stored). It will be appreciated, that any of the graphs shown in the figures herein may be displayed to a user as part of a user interface.

Description of FIGS. 4-5

FIG. 4 shows an illustrative graph 400 with different types of data plotted thereon according to certain example embodiments. As shown in graph 400, multiple different types of data may be combined into the same graph (or multiple graphs). Graph 400 includes open bid volume, open ask volume, market bid L1 volume, market ask L1 volume, total traded bid volume, and total traded ask volume. Multiple different types of data may be combined into one graph to allow users to better view or assess patterns within the data. In certain examples, the graph shown in 400 may be displayed to a user via user interface. A user may be able to zoom in and out on the graph (e.g., increasing the amount of data shown on the x or time-axis). In certain examples, a user may be able to define which elements of the data is displayed as part of graph 400. For example, a user may hide data points and graphical element represented for the open bid volume, while keeping the other graphical elements of the other data visible on graph 400.

The user interface may allow a user to define different windows over portions of graph 400 that is being displayed. The windows that a user may define may be overlaid onto a graph that is displayed of the time series (or other) data. This is illustratively shown in FIG. 5 with example windows 410, 412, 414 that may be defined over graph 400.

Users may define windows (e.g., those shown in FIG. 5) by using a touch screen, mouse, keyboard, and/or other user input devices to define the windows. For example, if a user is using a mouse as an input device, they may click in at the area that corresponds to the upper left corner of the bounding window they are defining. The user may then click a second time to define the lower right portion of the window. Other input techniques may also be used. For example, a user may click one an then drag a cursor on a screen to define the window. In another example, if a touch screen is used as input, a user can touch in one area to define the one corner of a bounding box and then another corner to define an opposing corner. Other shapes besides rectangular shapes may also be used to define bounding boxes. For example, data may be represented in a scatter plot and users can circle or otherwise bound the data within that graph by drawing on the graph.

Returning to FIG. 5, window 410 is a portion of the data that a user may identify as not being representative of a particular issue or pattern (e.g., spoofing). Windows 412 and 414 may be windows that a user identifies (e.g., by generating the shown windows) as being representative of a particular issue (e.g., spoofing). In certain examples, different types of windows may be used to classify or identify different types of issues or patterns. Data for the user-defined windows may be stored for later use (e.g., to a data store 204 that may be a database or the like).

Description of FIGS. 6A-7

Before using the user defined windows to develop a model, the windows may be converted into fixed length windows. FIGS. 6A-6C show how the example windows may be converted into fixed length windows according to certain example embodiments. In FIG. 6A shows how multiple fixed windows 520, 522, and 524 are generated based on user defined window 414. FIG. 6B shows how multiple fixed windows 530, 532, 534, and 536 are generated based on user defined window 412. And FIG. 6C shows how multiple fixed windows 540, 542, and 544 are generated based on user defined window 410.

The fixed window sizes may be fixed for a certain number of time slices (e.g., 6 or 8, five second time slices—in other words, 30 or 40 total seconds). As shown in 6A-6C, multiple fixed sized windows can be generated for one user defined window. Thus, if a user defined window is 25 seconds in length and a 40-second fixed window size is used then there are multiple different time spans that a 40-second fixed window may be arranged and still overlap the user defined 25-second window. This is illustrated in, for example, FIG.

6A where three different 35-second fixed length windows are arranged around the time span defined by the user defined 25-second window.

In certain example embodiments, system 102 may be programmed to ensure that the relevant portion of the data of interest is encompassed by the fixed length windows. In the case of multiple fixed windows (e.g., where the size of the fixed length windows allows for multiple fixed length windows to encompass a user defined window), the right handed side of the left most fixed length window may align with the right side of the user defined window user and the left side of the right most fixed length window may align with the left side of the user defined window. For example, the right side (e.g., the "end" of the time frame that is encompassed by window 520) of window 520 (which is the left or earliest fixed length window that encompasses window 414) is aligned with the right side of window 414 at approximately timestamp 11:03:15.

In certain examples, multiple fixed length windows may be placed between the left most window (e.g., the window that covers the earliest time period for a given user defined window) and right most window (e.g., the window that covers the latest time period for the same user defined window) at every interval (e.g., if the data has been spliced at 5 ms intervals the fixed length windows may be spaced apart by 5 ms). For example, referring to FIG. 6A as an example, window 522 is included between window 520 (the earliest window generated in connection with window 414) and window 524 (the latest window that is generated in connection with window 414). In certain examples, the fixed sized windows may be "anchored" to the right side of the user defined window. In certain examples, a fixed length positive window may overlap with a location of a user defined negative window. An example of this is shown in FIG. 6B where window 530 is generated and overlaps the time period defined by window 410. However, a fixed length window for a negatively defined window may be barred from overlapping a user defined positive window. For example, none of the fixed length windows (540, 542, and 544) that are generated based on window 410 (a window that defines a negative window—e.g., where a given condition is not present) overlap with the time span defined by window 412.

In certain examples, if the fixed size for the windows is greater than the user defined size for a negative window, then the negatively defined window can be dropped (e.g., ignored). In certain examples, if the fixed size of a positively defined window is larger (e.g., greater than or more than twice the size of a fixed window) than the user window then the window may be dropped or ignored.

In certain examples, the data and the windows may be mirrored. FIG. 7 illustratively shows how data may be mirrored to form additional training examples according to certain example embodiments.

Description of FIGS. 8-9

Once a model has been developed, new data may be applied to that model to identify predictive windows. FIG. 8 illustrates predictive windows 802-826 that have been identified by a machine learned model according to certain example embodiments. Each window may be assigned a probability of whether the item of interest or particular data pattern (e.g., an instance of spoofing) is present in the given window. In the windows of FIG. 8, 802 is predicted as being 0% likely as a true positive, 804 is 1% likely, 806 is 3% likely, 808 is 15% likely, 810 is 16% likely, 812 is 95% likely, 814 is 96% likely, 816 is 98% likely, 818 is 95% likely, 820 is 99% likely, 822 is 99% likely, 824 is 97% likely, 826 is 95% likely. The window sizes of the predictive windows may be fixed in size or may be variable according to certain example embodiments.

In certain example embodiments, the data that is applied to the model may be streamed in from the exchange 104 in real-time (which include substantially real-time—e.g., on a millisecond, second, or minute level of granularity) to thereby provide real-time identification of patterns within the market (e.g., spoofing).

Once the predictive windows are developed by using the model, then the predictive windows may be combined into a combined window 910 as shown in FIG. 9. In certain example embodiments, contiguously located windows may be grouped or combined when their likelihood meets or exceeds a threshold. For example, in FIG. 9 the predictive windows may be combined when they meet or exceed a 95% likelihood. The combined window 910 may be used to generate a task. The task may be assigned to a user for the user to verify or validate that the combined window 910 does contain the item of interest. For example, the user may login to a user interface that displayed a list of tasks. The user may click on successive tasks and each task that is clicked on will display a graph (such as that shown in FIG. 9) that includes the window and the underlying data of interest. The user may then click on a validate or invalidate button to indicate if the identified window has been correctly identified. In certain example embodiments, a user may also adjust the temporal "width" of the window. For example, combined window 910 may be shrunk by 5 or 10 seconds on the right and 5 seconds on the left.

Description of FIG. 10

FIG. 10 is a block diagram of an example computing device 1000 (which may also be referred to, for example, as a "computing device," "computer system," or "computing system") according to some embodiments. In some embodiments, the computing device 1000 includes one or more of the following: one or more hardware processors 1002; one or more memory devices 1004; one or more network interface devices 1006; one or more display interfaces 1008; and one or more user input adapters 1010. Additionally, in some embodiments, the computing device 1000 is connected to or includes a display device 1012. As will explained below, these elements (e.g., the hardware processors 1002, memory devices 1004, network interface devices 1006, display interfaces 1008, user input adapters 1010, display device 1012) are hardware devices (for example, electronic circuits or combinations of circuits) that are configured to perform various different functions for the computing device 1000.

In some embodiments, each or any of the hardware processors 1002 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1002 uses an instruction set architecture such as x86 or Advanced RISC Machine (ARM).

In some embodiments, each or any of the memory devices 1004 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1002). Memory devices 1004 are examples of non-volatile computer-readable storage media.

In some embodiments, each or any of the network interface devices 1006 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1008 is or includes one or more circuits that receive data from the processors 1002, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1012, which displays the image data. Alternatively or additionally, in some embodiments, each or any of the display interfaces 1008 is or includes, for example, a video card, video adapter, or graphics processing unit (GPU).

In some embodiments, each or any of the user input adapters 1010 is or includes one or more circuits that receive and process user input data from one or more user input devices (not shown in FIG. 10) that are included in, attached to, or otherwise in communication with the computing device 1000, and that output data based on the received input data to the processors 1002. Alternatively or additionally, in some embodiments each or any of the user input adapters 1010 is or includes, for example, a PS/2 interface, a USB interface, a touchscreen controller, or the like; and/or the user input adapters 1010 facilitates input from user input devices (not shown in FIG. 10) such as, for example, a keyboard, mouse, trackpad, touchscreen, etc.

In some embodiments, the display device 1012 may be a Liquid Crystal Display (LCD) display, Light Emitting Diode (LED) display, or other type of display device. In embodiments where the display device 1012 is a component of the computing device 1000 (e.g., the computing device and the display device are included in a unified housing), the display device 1012 may be a touchscreen display or non-touchscreen display. In embodiments where the display device 1012 is connected to the computing device 1000 (e.g., is external to the computing device 1000 and communicates with the computing device 1000 via a wire and/or via wireless communication technology), the display device 1012 is, for example, an external monitor, projector, television, display screen, etc.

In various embodiments, the computing device 1000 includes one, or two, or three, or four, or more of each or any of the above-mentioned elements (e.g., the processors 1002, memory devices 1004, network interface devices 1006, display interfaces 1008, and user input adapters 1010). Alternatively or additionally, in some embodiments, the computing device 1000 includes one or more of: a processing system that includes the processors 1002; a memory or storage system that includes the memory devices 1004; and a network interface system that includes the network interface devices 1006.

The computing device 1000 may be arranged, in various embodiments, in many different ways. As just one example, the computing device 1000 may be arranged such that the processors 1002 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1000 may be arranged such that: the processors 1002 include two, three, four, five, or more multi-core processors; the network interface devices 1006 include a first network interface device that implements Ethernet and a second network interface device that implements WiFi and/or Bluetooth; and the memory devices 1004 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of participant systems 106A and 106B, exchange 104, data analysis system 102, quantizer module 108, annotation module 110, ML module 112, verification module 114, and client system 116, data store 204, API 208, each of which will be referred to individually for clarity as a "component" for the remainder of this paragraph, are implemented using an example of the computing device 1000 of FIG. 5. In such embodiments, the following applies for each component: (a) the elements of the 1000 computing device 1000 shown in FIG. 10 (i.e., the one or more processors 1002, one or more memory devices 1004, one or more network interface devices 1006, one or more display interfaces 1008, and one or more user input adapters 1010), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1004 (e.g., in various embodiments, in a volatile memory device such as a RAM or an instruction register and/or in a non-volatile memory device such as a flash memory or hard disk) and all actions described herein as performed by the software modules are performed by the processors 1002 in conjunction with, as appropriate, the other elements in and/or connected to the computing device 1000 (i.e., the network interface devices 1006, display interfaces 1008, user input adapters 1010, and/or display device 1012); (c) alternatively or additionally, to the extent it is described herein that the component processes and/or otherwise handles data, in some embodiments, such data is stored in the memory devices 1004 (e.g., in some embodiments, in a volatile memory device such as a RAM and/or in a non-volatile memory device such as a flash memory or hard disk) and/or is processed/handled by the processors 1002 in conjunction, as appropriate, the other elements in and/or connected to the computing device 1000 (i.e., the network interface devices 1006, display interfaces 1008, user input adapters 1010, and/or display device 512); (d) alternatively or additionally, in some embodiments, the memory devices 1002 store instructions that, when executed by the processors 1002, cause the processors 1002 to perform, in conjunction with, as appropriate, the other elements in and/or connected to the computing device 1000 (i.e., the memory devices 1004, network interface devices 1006, display interfaces 1008, user input adapters 1010, and/or display device 512), each or any combination of actions described herein as performed by the component and/or by any software modules described herein as included within the component.

Consistent with the description herein, including the preceding paragraph, as one example, in an embodiment where an instance of the computing device 1000 is used to implement the data analysis system 102, the memory devices 1004 could load and store datasets (both raw and implied) and a generated machine learned model, and/or store the data described herein as processed and/or otherwise handled by the client side interfaces that are used to display the various graphs herein. Processors 1002 could be used to operate the process shown in FIG. 2B, the quantizer module 108, the annotation module 110, the ML module 112, the verification module 114, and/or otherwise process the data described herein as processed by the data analysis system 102, the exchange system 104, and/or the client system 116.

The hardware configurations shown in FIG. 10 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 10, (e) via other hardware arrangements, architectures, and configurations, and/or via combinations of the technology described in (a) through (e).

Technical Advantages of Described Subject Matter

In certain example embodiments, the transactional data received from a computer system (e.g., an exchange computer system) may be time sliced along fixed (or other defined) time intervals. This process allows for compressing or rolling up the potentially vast amount of transactional data while also maintaining important information that is represented by the transactions within a given time slice. The data that is produced may then be used as input for the machine learning process. It will be appreciated that this can improve the speed at which the machine learned process operates (e.g., the speed at which a model is developed) while not detracting from the overall accuracy of the resulting model.

In certain examples, the time sliced data can also be used to present an improved graphical view of the underlying data to a user that is defining or identifying patterns within the data. Patterns within the data may be identified by windowing the portion of the data that indicates a particular pattern.

In certain examples, the user defined windows may be converted into fixed sized windows that are used for the machine learning process. This formatting of the user defined windows can improve the efficiency of the machine learning process while still maintaining the relevance of the patterns in the data previously identified by a user.

In certain examples, the techniques herein may allow for more efficiently spotting "bad" or abusive trading behavior (e.g. manipulation of the market) in an efficient manner. The techniques herein may operate faster than conventional techniques for identifying abusive trading behavior and therefore may increase the security (e.g., by increasing the confidence that the overall market is not being manipulated) of the overall exchange platform that is being used by other participants.

In certain examples, generating a dataset with stateless records from a dataset with stateful records may allow for parallel processing of the generated dataset. The parallelization may be accomplished because the respective records do not need to be processed in any particular order (e.g., they are stateless with respect to time). This parallelization may thus improve the speed by which the records can be processed in certain environments (such as for machine learning, visual charting of the data, and the like).

The techniques herein may also be applied to other data domains to assist in spotting patterns and developing machine learned models for identifying such patterns within data streams. Such data streams may include, for example, weather data, image data, video data, etc.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Whenever it is described in this document that a function, process, component, or other element is "automatic" or "automatically" performed, that function, process, component, or other element is one that is performable without needing human intervention, input, and/or processing. Thus, for example, description of "automatic generation" includes generation of the item without requiring human intervention. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-9, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
a non-transitory computer readable storage medium configured to store a first time series dataset that includes time series transaction data records that each indicate how different transaction requests have been applied to a data structure at a corresponding time; and
at least one hardware processor coupled to the non-transitory computer readable storage medium, the at least one hardware processor configured to perform operations comprising:
generating a derived dataset that is based on, for each of the time series transaction data records at a corresponding time, a representation of the data structure at the corresponding time;
generating a reduced dataset from the derived dataset, wherein each record of the reduced dataset corresponds to a different interval over the derived dataset, wherein each record of the reduced dataset includes at least two different values calculated based on data from the derived dataset that is within a corresponding interval;
generating a training dataset based on the reduced dataset;
executing a training process to train a model using the generated training dataset;
performing machine learning inference using a second time series dataset, which is different than the first time series dataset, on the trained model to thereby identify instances of a pattern within the different time series data;
based on the performed machine learning inference, obtaining, for each of a plurality of segments over the different time series dataset, a probability of occurrence of the pattern; and
generating a combined window that is based on a multiple segments of the plurality of segments that each have a probability that exceeds a probability threshold.

2. The computer system of claim 1, the operations further comprising:
constructing, for each of the time series transaction data records, a state of the data structure at a corresponding time, wherein generation of the derived dataset is further based on the construction of the state of the data structure at each correspond time.

3. The computer system of claim 1, wherein the operations further comprise:
processing multiple inputs that are provided via a user input device from a user, the processing of the multiple inputs to define a plurality of user-defined intervals over different intervals for the reduced dataset.

4. The computer system of claim 3, wherein the operations further comprise:
generating, for display on a display device, a graphical display that is based on the reduced dataset, wherein at least one of the plurality of user-defined intervals is overlaid on a representation of the reduced dataset that is part of the graphical display.

5. The computer system of claim 3, wherein at least some of plurality of user-defined intervals identify pattern(s) within the reduced dataset.

6. The computer system of claim 3, wherein the plurality of user-defined intervals includes at least one positive indication of the pattern within the reduced dataset and at least one negative indication of the pattern within the reduced dataset.

7. The computer system of claim 3, wherein the operations further comprise:
programmatically generating a plurality of fixed-length intervals based on the plurality of user-defined intervals, wherein a first group of fixed-length intervals is generated based on a first interval of the plurality of user-defined intervals.

8. The computer system of claim 7, wherein each of the first group of fixed-length intervals covers the same amount of time and each of the first group of fixed-length intervals covers different periods of time.

9. The computer system of claim 7, wherein a time span of a first fixed-length interval of the first group of fixed-length intervals is programmatically generated with an end of the time span of the first fixed-length interval matches to an end of a time span of the first interval.

10. The computer system of claim 9, wherein the time span of the first fixed-length interval covers a time period that is prior to any other fixed-length intervals in the first group of fixed-length intervals.

11. The computer system of claim 1, the operations further comprising:
generating, for display on a display device, a graphical display that includes: 1) a representation of the different time series dataset, and 2) at least a representation of the combined window overlaying the representation of the different time series dataset to indicate a presence of the pattern within the different time series dataset.

12. The computer system of claim 1, the operations further comprising:
automatically generating a task for each of the identified instance of the pattern within the second time series dataset.

13. The computer system of claim 1, the operations further comprising:
receiving data for the second time series dataset and, in real time, repeatedly performing the machine learning inference on data of the second time series dataset.

14. The computer system of claim 1, wherein the at least two different values include a value from a beginning of the corresponding interval, a value from an end of the corresponding interval, a highest value within the corresponding interval, and a lowest value within the corresponding interval.

15. A method that is executed on a computer system, the method comprising:
storing, to non-transitory storage, a first time series dataset that includes time series transaction data records that each indicate how different transaction requests have been applied to a data structure at a corresponding time;
generating a derived dataset that is based on, for each of the time series transaction data records at a corresponding time, a representation of the data structure at the corresponding time;
generating a reduced dataset from the derived dataset, wherein each record of the reduced dataset corresponds to a different interval over the derived dataset, wherein each record of the reduced dataset includes at least two different values calculated based on data from the derived dataset that is within a corresponding interval;
generating a training dataset based on the reduced dataset;
executing a training process to train a model using the generated training dataset;
performing machine learning inference using a second time series dataset, which is different than the first time series dataset, on the trained model to thereby identify instances of a pattern within the different time series data;
based on the performed machine learning inference, obtaining, for each of a plurality of segments over the different time series dataset, a probability of occurrence of the pattern; and
generating a combined window that is based on a multiple segments of the plurality of segments that each have a probability that exceeds a probability threshold.

16. The method of claim 15, further comprising:
processing multiple inputs that are provided via a user input device from a user, the processing of the multiple inputs to define a plurality of user-defined intervals over different intervals for the reduced dataset.

17. The method of claim 16, further comprising:
generating, for display on a display device, a graphical display that is based on the reduced dataset, wherein at least one of the plurality of user-defined intervals is overlaid on a representation of the reduced dataset that is part of the graphical display.

18. The method of claim 16, further comprising:
programmatically generating a plurality of fixed-length intervals based on the plurality of user-defined intervals, wherein a first group of fixed-length intervals is generated based on a first interval of the plurality of user-defined intervals.

19. The method of claim 15, wherein the at least two different values include a value from a beginning of the corresponding interval, a value from an end of the corresponding interval, a highest value within the corresponding interval, and a lowest value within the corresponding interval.

20. A non-transitory computer readable storage medium storing computer readable instructions for use by at least one hardware processor of a computer system, the stored computer readable instructions comprising instructions that are configured to cause the at least one hardware processor to perform operations comprising:
storing, to non-transitory storage, a first time series dataset that includes time series transaction data records that each indicate how different transaction requests have been applied to a data structure at a corresponding time;
generating a derived dataset that is based on, for each of the time series transaction data records at a corresponding time, a representation of the data structure at the corresponding time;
generating a reduced dataset from the derived dataset, wherein each record of the reduced dataset corresponds to a different interval over the derived dataset, wherein each record of the reduced dataset includes at least two different values calculated based on data from the derived dataset that is within a corresponding interval;
generating a training dataset based on the reduced dataset;
executing a training process to train a model using the generated training dataset;
performing machine learning inference using a second time series dataset, which is different than the first time series dataset, on the trained model to thereby identify instances of a pattern within the different time series data;
based on the performed machine learning inference, obtaining, for each of a plurality of segments over the different time series dataset, a probability of occurrence of the pattern; and
generating a combined window that is based on a multiple segments of the plurality of segments that each have a probability that exceeds a probability threshold.

* * * * *